United States Patent [19]
Hong et al.

[11] Patent Number: 5,954,991
[45] Date of Patent: Sep. 21, 1999

[54] ORDERED STRUCTURES IN HOMOGENEOUS MAGNETIC FLUID THIN FILMS AND METHOD OF PREPARATION

[76] Inventors: Chin-Yih Rex Hong; Herng-Er Horng, both of 4F, No. 31, Lane 57 Ta Tze Street, Ta Tze, Taipei 104, Taiwan

[21] Appl. No.: 08/835,107

[22] Filed: Apr. 4, 1997

[51] Int. Cl.$^6$ .................................. G02F 1/09; H01F 1/44
[52] U.S. Cl. ...................................... 252/62.52; 252/62.54; 359/280; 359/281; 359/283
[58] Field of Search .............................. 252/62.52, 62.54; 359/280, 281, 283

[56] References Cited

U.S. PATENT DOCUMENTS

| | | | |
|---|---|---|---|
| 3,648,269 | 3/1972 | Rosenweig et al. | 340/373 |
| 3,917,538 | 11/1975 | Rosenweig | 252/62.51 |
| 3,972,595 | 8/1976 | Romankiw et al. | 350/267 |
| 4,019,994 | 4/1977 | Kelley | 252/62.52 |
| 4,384,761 | 5/1983 | Brady et al. | 350/96.2 |
| 5,351,319 | 9/1994 | Ginder et al. | 385/6 |

OTHER PUBLICATIONS

Chin–Yih Hong, et al., "Ordered Structures in Fe$_3$O$_4$ Kerosene–Based Ferrofluids," Abstract from Journal of Applied Physics 81(8):4275–4277, Apr. 15, 1997, 41st Annual Conference on Magnetism and Magnetic Materials, Atlanta, GA, USA, Nov. 12–15, 1996.

Tomco, L., et al., "Study of the Structuralization of the Magnetic Particles in Magnetic Fluids," IEEE Transactions on Magnetics, 30:1112–1113 (1994).

Shimoiizaka, J., "Simple Efficient, Magnetic Fluid Preparation On Industrial Scale by Preparing Ferromagnetic Oxide In Low Polarity Oils," Database WPI, Section Ch, Week 7622, Derwent Publications Ltd., London, G.B.; Class E19, AN 76–41018X XP002066283 & JP 51 044 579 A (Apr. 16, 1976).

Gardineer, B.A., et al., "Preparation of Magnetics Inks," IBM Technical Disclosure Bulletin, 18:3123–3124 (1976).

Petit, P. A., et al., "Evolution of the Domain–Like Pattern in a Film of Ferrofluid in Normal Fields," Journal of Magnetism and Magnetic Materials, 113:127–131, (1992).

(List continued on next page.)

*Primary Examiner*—Melissa Bonner
*Attorney, Agent, or Firm*—McCutchen, Doyle, Brown & Enersen; Michael J. Shuster

[57] ABSTRACT

Methods for preparing homogeneous magnetic fluid compositions capable of forming ordered one dimensional structures or two dimensional lattices in response to externally applied magnetic fields are disclosed. The compositions are prepared using improved co-precipitation methods in which the steps of the procedure have been tuned to reduce sample heterogeneity. Fe$_3$O$_4$ particles are coated with a surfactant and dispersed in a continuous carrier phase to form these homogeneous magnetic fluid compositions. The ability of these compositions to generate ordered structures can be tested by holding a magnet near a thin film of the compositions and observing the formation of colors in the region near the magnet. Methods for controlling the characteristic spacing of the ordered structures formed by the composition also are disclosed. Relevant parameters include the thickness of the film, the strength and orientation of the externally applied magnetic field, the rate of change of field strength, the volume fraction of the magnetic particles dispersed in the continuous phase, and the temperature of the homogeneous magnetic fluid. The homogeneous magnetic fluid composition is useful for the manufacture of liquid crystal devices. The devices take advantage of the serendipitous fact that the spacings in the material are on the order of the wavelength of visible light. A variety of magnetic-optical devices can be constructed that use the ordered structures to diffract, reflect, and polarize light in a controlled and predictable manner. These devices include color displays, monochromatic light switches, and tunable wavelength filters.

17 Claims, 13 Drawing Sheets

(2 of 13 Drawing Sheets(s) Filed in Color)

OTHER PUBLICATIONS

Taketomi, S., et al., "Magnetic Birefringence and Dichroism in Magnetic Fluid," IEE Translation Journal on Magnetics in Japan, 4:384–394 (1989).

Bajaj, R. and Malik, S.K, "Pattern Formation In Ferrofluids," Journal of Magnetism and Magnetic Materials, vol. 149, pp. 158–161 ( 1995), No Month.

Berkovsky, B. M., et al., *Magnetic Fluids Engineering Applications*, pp. 1–24, The Oxford University Press, New York, New York (1993), No Month.

Bibette, J., "Monodisperse Ferrofluid Emulsions", Journal of Magnetism and Magnetic Materials, vol. 122, pp. 37–41 (1993), No Month.

Dababneh, M.S., and Ayoub, N.Y. "The Effect of Oleic Acid on the Stability of Magnetite Ferrofluid," IEEE Transactions on Magnetics, vol. 31, pp. 4178–4180 (Nov. 1995).

da Silva, M. F., and Figueiredo Neto, A.M., "Optical and X–Ray Scattering Studies of Ionic Ferrofluids of $MnFe_2O_4$, $\gamma-Fe_2O_3$, and $Co\ Fe_2O_4$," Physical Review E, vol. 48, No. 6, pp. 4483–4491 (Dec. 1993).

Donatini, F., Neveu, S., and Monin, J., "Measurements of Longitudinal Magneto–Optic Effects in Ferrofluids: A Dynamic Method", Journal of Magnetism and Magnetic Materials, vol. 162, pp. 69–74 (1996), No Month.

Fermigier, M., and Gast, Alice P., "Structure Evolution in a Paramagnetic Latex Suspension," Journal of Colloid and Interface Science, vol. 154, No. 2, pp. 522–539 (Dec. 1992).

Flores, G. A., Ivey, M. L., Liu, J., Mohebi, M., and Jamasbi, J., "Field–Induced Labyrinthine Patterns In Ferrofluid Emulsions," vol. 10, pp. 3283–3292 (1996), No Month.

Gribanov, N.M., Bibik, E.E., Buzonov, O.V., and Naumov, V.N. "Physico–Chemical Regularities of Obtaining Highly Dispersed Magnetite by the Method of Chemical Condensation," Journal of Magnetism and Magnetic Materials, vol. 85, pp. 7–10 (1990), No Month.

Hagenbuchle, M., Sheaffer, P., Zhu, Y., and Liu, J., "Static and Dynamic Light Scattering of Dilute Magnetorheological Emulsions," vol. 10, pp. 3057–3065 (1996), No Month.

Hwang, Y. H. and Wu, X–l., "Quasi–Two–Dimensional Domain Structures of Magnetic Particles in a Static Field," Physical Review E, vol., No. 4, pp. 3102–3108, (Apr. 1994).

Lee, J, Isobe, T, and Senna, M, "Preparation of Ultrafine $Fe_3O_4$ Particles by Precipitation in the Present of PVA at High pH," Journal of Colloid Interface Science, vol. 177, pp. 490–494 (1996), No Month.

Liu, J., et al., "Field–Induced Structures in Ferrofluid Emulsions," Physical Review Letters, vol. 74, No. 14, pp. 2828–2831 (Apr. 3, 1995).

Liu, J., Mou, T., Zhu, Y., Haddadian, E., Pousset, J., and Lim, S. R. "Effect of Cell Confinement on the Evolution of Field–Induced Structures in a Magnetorheological Fluid," Journal of Intelligent Material Systems and Structures, vol. 7, pp. 583–588 (Sep. 1996).

Massart, R., et al., "Preparation and Properties of Monodisperse Magnetic Fluids," Journal of Magnetism and Magnetic Materials, vol. 149, pp. 1–5 (1995), No Month.

Mehta, R. V., Upadhyay, R.V., Dasannacharya, B.A., Goyal, P.S., and Rao, K.S., "Magnetic Properties of Laboratory Synthesized Magnetic Fluid and their Temperature Dependence," Journal of Magnetism and Magnetic Materials, vol. 132, pp. 153–158 ( 1994), No Month.

Mou, T., G. A. Flores and J. Liu, "The Evolution of Field–Induced Structure of Confined Ferrofluid Emulsions," International Journal of Modern Physics B, vol. 8, Nos. 20 & 21, pp. 2779–2787 (1994), No Month.

Popplewell, J., Sakhnini, L., "The Dependence of the Physical and Magnetic Properties of Magnetic Fluids on Particle Size," Journal of Magnetism and Magnetic Materials, vol. 149, pp. 72–77 (1995).

Qi, Z., Wang, J. H., and Zhu, H. S., "Magnetic Field And Concentration Dependence of Light Scattering From a Ferrofluid," Journal of Materials Science, vol. 31, pp. 4807–4810 (1996), No Month.

Rosenbaum, T. F., Shi, X. D., and Nagel, S. R., "Local Order and Global Disorder in Bidisperse Ferrofluids," Journal of Physical Chemistry, vol. 99, pp. 2875–2877 (1995), No Month.

Saito, M., Takakuwa, M., and Miyagi, M., "Optical Constants of Magnetic Fluids and their Application to Optical Switches," IEICE Transactions on Electronics, vol. E78–C, pp. 1465–1469 (Oct. 1995).

Seul, M., and Murray, C. A., "Scale Transformation of Magnetic 'Bubble' Arrays: Coupling of Topological Disorder and Polydispersity," Science, vol. 262, p. 558 (Oct. 22, 1993).

Skjeltorp, A. T., "One– and Two–Dimensional Crystallization of Magnetic Holes," Physical Review Letters, vol. 51, No. 25, pp. 2306–2309 (Dec. 19, 1983).

Skjeltorp, A. T., "Ordering Phenomena of Particles Dispersed in Magnetic Fluids (invited)," J. Appl. Phys., vol. 57, No. 1, pp. 3285–3290 (Apr. 15, 1985).

Skjeltorp, Arne T., "Condensation and Ordering of Colloidal Spheres Dispersed in a Ferrofluid," Physica A, vol. 213, pp. 30–40 (1995), No Month.

Sutariya, G. M., R. V. Upadhyay, and R. V. Mehta, "Preparation and Properties of Stable Magnetic Fluid Using Mn Substituted Ferrite Particles," Journal of Colloid and Interface Science, vol. 155, pp. 152–155 (1992), No Month.

Upadhyay, R.V., Davies, K.J., Wells, S., and Charles, S.W., "Preparation and Characterization of Ultra–Fine $MnFe_2O_4$ and $Mn_xFe_{1-x}Fe_2O_4$ Spinel Systems: I. Particles," Journal of Magnetism and Magnetic Materials, vol: 132, pp. 249–257 ( 1994), No Month.

Upadhyay, R.V., Davies, K.J., Wells, S., and Charles, S.W., "Preparation and Characterization of Ultra–Fine $MnFe_2O_4$ and $Mn_xFe_{1-x}Fe\ O_4$ Spinal Systems: II. Magnetic Fluids," Journal of Magnetism and Magnetic Materials, vol. 139, pp. 249–254 (1995), No Month.

Wang, H., et al., "Periodic Branched Structures in a Phase–Separated Magnetic Colloid," Physical Review Letters, vol. 72, No. 12, pp. 1929–1932 (Mar. 21, 1994).

Wirtz, D., and Marc Fermigier, "One–Dimensional Patterns and Wavelength Selection in Magnetic Fluids," Physical Review Letters, vol. 72, No. 14, pp. 2294–2297 (Apr. 4, 1994).

Zhu, Y., Ivey. M. L., Sheaffer, P., Pousset, J., and Liu, J., "Magnetic Field–Induced Phase Transitions In Ferrofluid Emulsion," International Journal of modern physics B, vol. 10, pp. 2973–2981 (1996), No Month.

Zubarev, A. Y. "Periodical Domain Structures In Thin Layers of Magnetic Fluids," Colloid Journal, vol. 57, pp. 645–648 (1995), No Month.

Wang et al, "Periodic Branched Structures in a Phase–Separated Magnetic Colloid", Phy. Rev. Lett., vol. 72(12), pp. 1929–1932, Mar. 21, 1994.

Taketomi, "Magnetic Fluid's Anomalous Psudo–Cotton Mouton Effects about 10 Times Larger Than That of Nitrobenzene", Jap. J. App. Phy., vol. 22 (7), pp. 1137–1143, Jul. 1983.

A: CCD VIDEO CAMERA
B: PC
C: MICROSCOPE
D: SOLENOID
E: MAGNETIC FLUID THIN FILM
F: CURRENT SOURCE

H=70 Oe, L=6μm, Ms=10.58 emu/g, dH/dt=20 Oe/s

H=100 Oe, L=6μm, Ms=10.58 emu/g, dH/dt=20 Oe/s

H=300 Oe, L=6μm, Ms=10.58 emu/g, dH/dt=20 Oe/s

H=400 Oe, L=6μm, Ms=10.58 emu/g, dH/dt=20 Oe/s

L = 10 μm, H = 100 Oe, Ms = 10.58 emu/g, dH/dt = 20 Oe/s

L = 6 μm, H = 100 Oe, Ms = 10.58 emu/g, dH/dt = 20 Oe/s

L = 4 μm, H = 100 Oe, Ms = 10.58 emu/g, dH/dt = 20 Oe/s

L = 2 μm, H = 100 Oe, Ms = 10.58 emu/g, dH/dt = 20 Oe/s

A: PC
B: CCD VIDEO CAMERA
C: SOLENOID
D: MAGNETIC FLUID THIN FILM
E: INCIDENT ANGLE ADJUSTABLE MIRROR
F: TELESCOPE
G: WHITE LIGHT SOURCE
H: CURRENT SOURCE
I: LENS
J: APERTURE

ORDERED STRUCTURES IN HOMOGENEOUS MAGNETIC FLUID THIN FILMS AND METHOD OF PREPARATION

RELATED APPLICATION DATA

The present application is related to "Magnetic Fluid Thin Film Displays, Monochromatic Light Switch and Tunable Wavelength Filter," Hong, Chin-Yih Rex; Horng, Herng-Er; Yang, Hong-Chang, and Yeung, Wai Bong, Ser. No. 08/835,108, filed concurrently herewith.

FIELD OF THE INVENTION

The present invention comprises methods for producing homogeneous magnetic fluids capable of forming ordered crystalline structures. The invention also comprises methods for generating ordered structures in thin films of such fluids under the influence of externally applied magnetic fields, methods for controlling the structures generated in these films, and magnetic-optical devices based on these ordered structures. These devices include color displays, monochromatic light switches, and tunable wavelength filters.

BACKGROUND

Ferrofluids are a type of magnetic fluid that typically consist of colloidal magnetic particles such as magnetite or manganese-zinc ferrites, dispersed with the aid of surfactants in a continuous carrier phase. The average diameter of the dispersed magnetic particles ranges between 5–10 nm. Each particle has a constant magnetic dipole moment proportional to its size that can align with an external magnetic field.

Ferrofluids experience body forces in homogeneous magnetic fields, that allow their position to be manipulated, and thus enable the construction of devices such as rotary seals, bearings, and related mechanical devices. Ferrofluids also have been used to construct display devices such as those disclosed in U.S. Pat. Nos. 3,648,269 and 3,972,595, that use a magnetic field to capture an opaque magnetic fluid in a predetermined optical pattern. These types of devices usually operate by having an opaque magnetic fluid displace a transparent fluid and thereby produce optical contrast. Such display devices, however, do not generate ordered crystalline structures in the magnetic fluid, and are incapable of generating anything other than a monochromatic image.

Two general methods for producing ferrofluids have been used in the prior art. The first method reduces a magnetic powder to a colloidal particle size by ball-mill grinding in the presence of a liquid carrier and a grinding aid which also serves as a dispersing agent. This approach is exemplified in U.S. Pat. Nos. 3,215,572 and 3,917,538. The second approach is a chemical precipitation technique as exemplified in U.S. Pat. No. 4,019,994. Both of these techniques suffer from the disadvantage that there is heterogeneity in the size distribution of the resulting magnetic particles, the composition of these particles, and/or the interaction forces between the particles. This heterogeneity may produce deleterious effects on the ability of a ferrofluid to form ordered structures under the influence of a magnetic field.

Pattern forming systems of magnetic fluid films under the influence of external magnetic fields have recently attracted much interest. For these studies, a variety of different types of magnetic fluids have been used. For example, the aggregation process and one-dimensional patterns formed in suspensions of latex or polystyrene particles loaded with iron oxide grains under the influence of parallel fields have been studied by M. Fermigier and A. P. Gast, *J. Colloidal Interface Sci.* 154, 522 (1992), and D. Wirtz and M. Fermigier, *Phys. Rev. Lett.* 72, 2294 (1994). Quasi two dimensional periodic lattices have been reported to be formed in a phase separated magnetic fluid thin film under the influence of a perpendicular magnetic field. Wang et al., *Phys. Rev. Lett.* 72, 1929 (1994). FIG. 1 of this paper, however, shows that the resulting structure is disordered. Other investigators have generated more highly ordered two dimensional lattices in thin films of magnetic fluid emulsions or magnetic fluids containing non-magnetic spheres using perpendicular magnetic fields. However, these lattices tend to solidify and therefore are not suitable for applications requiring rapid interconversion between crystalline and amorphous states. See, e.g., Liu et al., *Phys. Rev. Lett.* 74, 2828 (1995), Skjeltorp, *Phys. Rev. Lett.* 51, 2306 (1983). Thus there is a recognized need in the art for ferrofluidic compositions that could be used to generate liquid-crystal devices that could be switched by small magnetic fields. See, e.g., da Silva and Neto, *Phys. Rev. E.* 48, 4483 (1993).

If a ferrofluid composition capable of reversibly forming ordered one dimensional structures or crystalline two dimensional lattices in a thin film under the influence of an external magnetic field could be manufactured, it would be useful for constructing a variety of new and useful liquid-crystal magneto-optical devices. For these reasons, a method is needed for generating homogeneous ferrofluidic compositions capable of reversibly forming ordered one dimensional structures or crystalline two dimensional lattices in a thin film under the influence of an external magnetic field. Also needed is a simple method for determining whether a thin film of a ferrofluidic composition is capable of generating well-ordered one dimensional structures or two dimensional lattices under the influence of external magnetic fields. Finally, it would be desirable to generate magneto-optical devices based on the ordered structures created in thin films of ferrofluidic compositions in response to external magnetic fields. Because the utility of such devices would be enhanced by developing methods for controlling the ordered structures formed in magnetic thin films of ferrofluids under the influence of external magnetic fields, methods for controlling the ordered structures so formed also are needed.

SUMMARY OF THE INVENTION

The present invention is directed to methods for generating homogeneous ferrofluidic compositions that are capable of forming ordered structures when a thin film of the fluid is subjected to an external magnetic field, as well as compositions synthesized according to this method. The method is based on an optimized co-precipitation technique. The invention also provides for methods of generating ordered one dimensional structures or two dimensional lattices in thin films of these ferrofluidic compositions in response to externally applied magnetic fields, as well as methods for determining the ability of a homogeneous magnetic field to form ordered structures. The invention also is directed to the ordered arrays formed in thin films of the homogeneous ferrofluidic compositions upon exposure to an external magnetic field. Also provided are methods for controlling the characteristic spacings of the one dimensional structures or two dimensional lattices by varying parameters such as the strength of the applied magnetic field, the orientation of the field to the film, wherein the angle between the external magnetic field and the plane of the film is 0° to 90°, the rate of change of magnetic field strength, the film thickness, the concentration of magnetic particles in the ferrofluidic composition, or the temperature of the composition. Further, the invention provides for liquid-crystal magnetic-optical devices based on ordered structures created in thin films of ferrofluids and the ability to control the spacings of these structures. These devices include: a light diffraction color display, a monochromatic light diffraction switch that can be turned on or off, a tunable light diffraction wavelength filter, a second type of light diffraction color display that combines the technologies of the first light diffraction color display and the monochromatic light diffraction switch, and a light double refraction color display comprising the magnetic fluid thin film of the present invention and polarizers.

These and other features, aspects, and advantages of the present invention will become better understood with regard to the following description, appended claims, and accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

$$H = 150\,\text{Oe}, \frac{dH}{dt} = 500\,\text{Oe/s}.$$

Figures 12A, 12B, 12C:
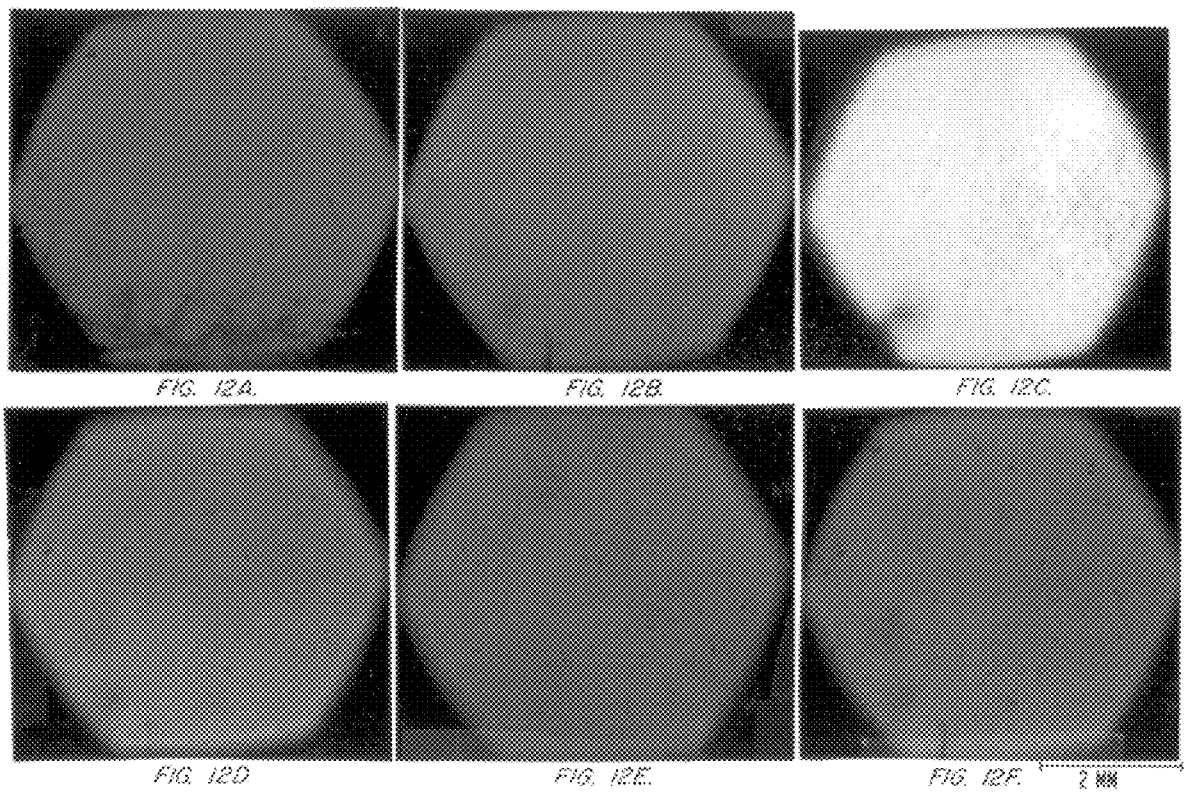

FIG. 12 shows different colors produced by a magneto-optical device comprising a homogeneous ferrofluidic thin film as the externally applied magnetic field strength is varied.

Figure 13:
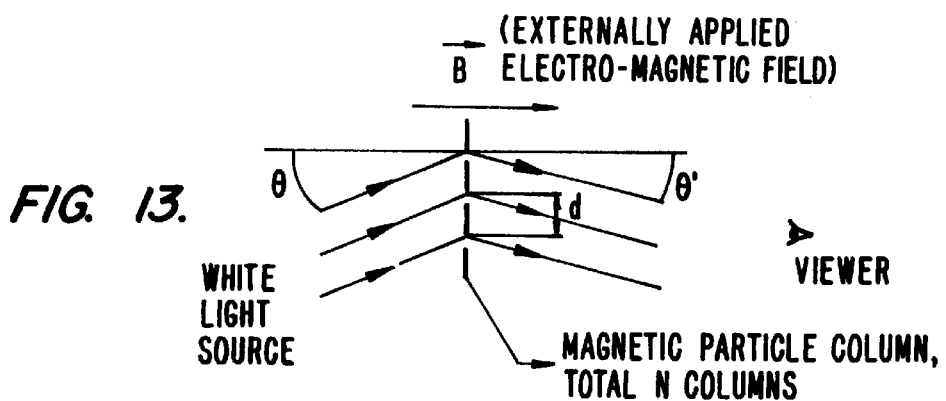

FIG. 13 illustrates the cross-section of a homogeneous ferrofluidic thin film for a first type of light diffraction display device.

Figure 14:
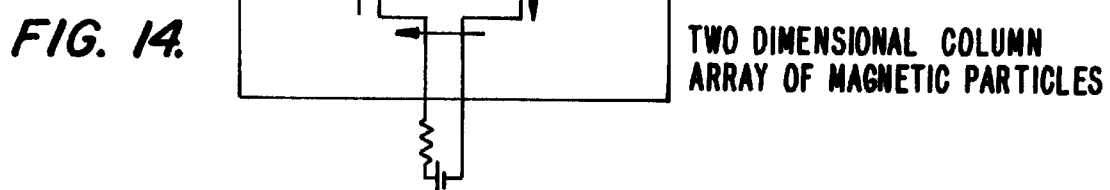

FIG. 14 illustrates the design of an individual pixel element comprising a homogeneous ferrofluidic thin film, a means for generating a magnetic field, and a means for controlling the strength of the field.

Figure 15:
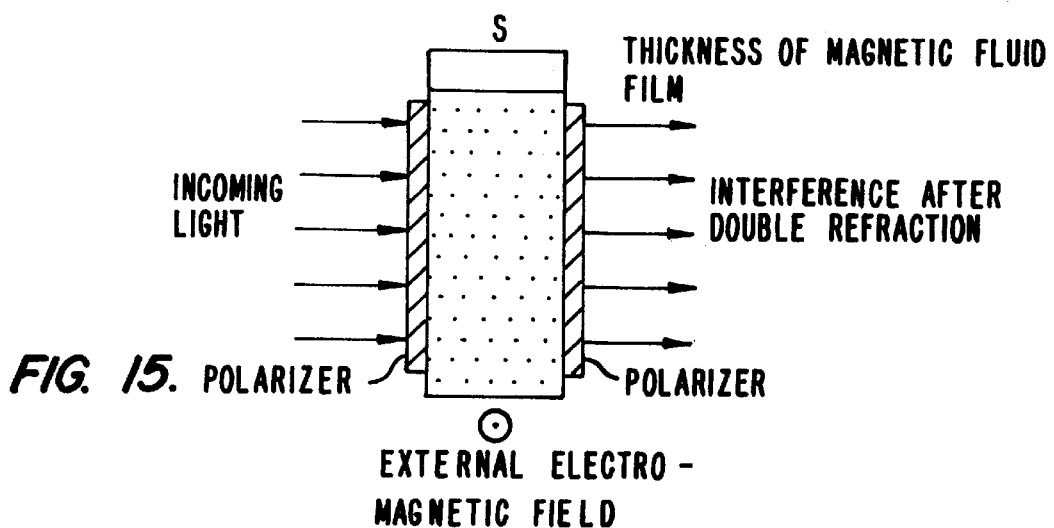

FIG. 15 illustrates a cross section of a homogeneous ferrofluidic thin film for a double refraction display device.

DETAILED DESCRIPTION OF PREFERRED EMBODIMENTS

The chemical synthesis of magnetite ($Fe_3O_4$) by co-precipitation of $FeSO_4$ and $FeCl_3$ in the presence of NaOH is based on a reaction proposed by W. C. Elmore in 1938. This co-precipitation reaction has been used to generate ferrofluids (also referred to as "magnetic fluids") in which the magnetite particles are coated with a surfactant and dispersed in a continuous phase (i.e., the particles are dispersed in a liquid that is not an emulsion). See, e.g., Fertman, V. E., "Magnetic Fluids Guide Book: Properties and Application," Hemisphere Publishing Corporation, 1989, ISBN-0-89116-956-3 at page 14. While such materials have proved extremely useful for the construction of various mechanical and display devices, they have not been amenable to forming ordered structures in thin films. Ordered structures are regular, periodic arrays of objects, that interact with electromagnetic radiation (e.g., visible light) to generate physical phenomena such as diffraction or polarization. These structures may be ordered in two dimensions (e.g., x and y), or one dimension (e.g., x). The former structures are sometimes also referred to as lattices, crystalline arrays, or 2-dimensional crystals. By carefully tuning the parameters of the co-precipitation reaction and subsequent coating and dispersing steps, we have synthesized improved ferrofluidic compositions capable of reversibly forming ordered structures in thin films under the influence of external magnetic fields.

While not wishing to be bound by any particular theory, it seems likely that improvements in the homogeneity of particle size distribution and/or interaction forces between the particles might be responsible for the ability of these ferrofluidic compositions to form ordered structures. Improvements in interaction force homogeneity in the ferrofluidic compositions of the instant invention may reflect reduced contamination of the compositions by $Fe_2O_3$ and/or water.

Figure 1:
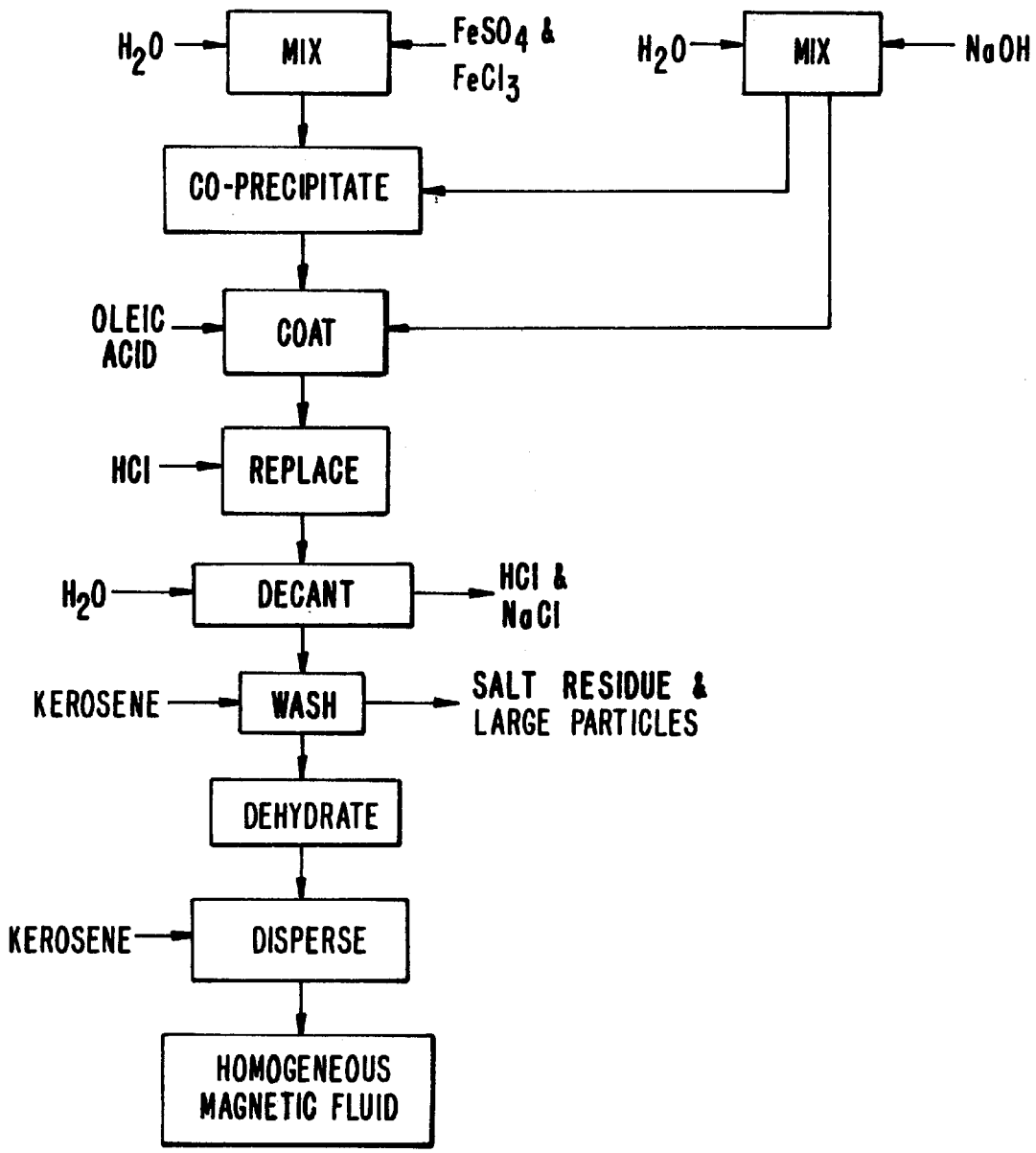
FIG. 1 is a flow chart diagram of the steps for preparation of a homogeneous ferrofluid capable of forming ordered one dimensional structures or two dimensional lattices when a thin film of the fluid is subjected to an external magnetic field.

According to the methods of the present invention, a composite material comprising ultra-fine magnetic particles uniformly dispersed in a continuous liquid phase is prepared by a co-precipitation technique whose controlling parameters were carefully tuned. The magnetic particles are $Fe_3O_4$ (magnetite) and result from a chemical reaction between a mixture of $FeSO_4$ and $FeCl_3$ and alkali such as NaOH, $Fe(OH)_2$, or $Fe(OH)_3$. The particles are coated with a layer of surfactant to prevent agglomeration, and are dispersed throughout a continuous liquid carrier phase to form a homogeneous magnetic fluid. FIG. 1 shows a flow chart diagram of the steps used to prepare a homogeneous magnetic fluid according to the present invention.

The general procedure used involves making an aqueous solution of $FeSO_4$ and $FeCl_3$. The temperature of the solution is maintained at 80° C. and is continuously stirred while a sufficient amount of a hydroxide containing base solution such as NaOH, $Fe(OH)_2$, or $Fe(OH)_3$ is rapidly added to keep the pH of the solution between approximately 11 and 11.5. It is important that not more than about 2 minutes elapse between the start of the base addition, and the attainment of the target pH value. The co-precipitation of $Fe_3O_4$ occurs over about a 20 minute time period. The formula for this reaction is as follows:

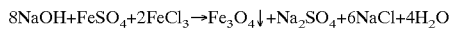

$$8NaOH + FeSO_4 + 2FeCl_3 \rightarrow Fe_3O_4\downarrow + Na_2SO_4 + 6NaCl + 4H_2O$$

After about 20 minutes, a surfactant such as oleic acid is added to the solution out of which the $Fe_3O_4$ has precipitated. This serves to coat the $Fe_3O_4$ particles. If the surfactant added is oleic acid, the pH value drops substantially at first, and an additional amount of base solution is added to keep the pH at a preferred range from about 9.5 to about 10 during the coating process. During the coating process, the temperature of the reaction is maintained at 80° C. This process takes around 30 minutes. At the end of this step, the reaction mix separates into three phases. Prior to proceeding to the next step, the upper layer is removed and discarded, and the middle and bottom layers are retained for use in the next step of the process. The formula of the chemical reactions that occur during the coating process are as follows when oleic acid is used as the surfactant and NaOH is used as the base:

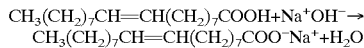

$CH_3(CH_2)_7CH = CH(CH_2)_7COOH + Na^+OH^- \rightarrow$
$CH_3(CH_2)_7CH = CH(CH_2)_7COO^-Na^+ + H_2O$  1.

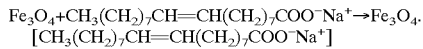

$Fe_3O_4 + CH_3(CH_2)_7CH = CH(CH_2)_7COO^-Na^+ \rightarrow Fe_3O_4 \cdot$
$[CH_3(CH_2)_7CH = CH(CH_2)_7COO^-Na^+]$  2.

After the coating process has completed (around 30 minutes), an acidification step is carried out to protonate the carboxylate group and thereby replace the $Na^+$ counterion with a proton. This is achieved by adding a sufficient amount of an acid such as HCl to the reaction mix as it is stirred to bring to the pH of the mixture down to a range of from around 0 to around 1. This step is carried out at room temperature (from about 20° C. to about 25° C.). The mix is stirred for approximately 20 minutes. During this time, magnetic particles coated with surfactant begin to coagulate. At the end of approximately 20 minutes, the mix phase separates into two layers. The top phase is removed, and the acidification step may be repeated as before an additional two or three times. At the end of each acidification step cycle, the top phase is removed prior to repeating this step. When the top phase no longer contains dark particulate material, the next step may be performed. The formula of the chemical reactions occurring during this replacement step is as follows when HCl is used as the acid:

$Fe_3O_4 \cdot [CH_3(CH_2)_7CH = CH(CH_2)_7COO^-Na^+] + H^+Cl^- \rightarrow Fe_3O_4 \cdot$
$[CH_3(CH_2)_7CH = CH(CH_2)_7COO^{31}\ H^+] + Na^+Cl^-$ The next step is decantation. During this step, de-ionized water is added to remove remaining counter ions such as HCl and NaCl from the surfactant-coated $Fe_3O_4$ product. A sufficient amount of de-ionized water at 65° C. is added to the coated $Fe_3O_4$ to bring the pH of the suspension to a value between around 4.7 to 5.0. The suspension is stirred as the water is added. After a sufficient amount of de-ionized water has been added, the stirring is stopped and the suspension is allowed to settle. The water is decanted away from the settled $Fe_3O_4$ and the product is washed.

Washing is achieved by adding a liquid used as a carrier (e.g., kerosene) to the settled $Fe_3O_4$ in a ratio of approximately 1.1 milliliter of kerosene per gram of coated $Fe_3O_4$. The two components are stirred until the solid $Fe_3O_4$ is completely suspended in the carrier. This suspension is placed in a centrifuge tube and subjected to a short, low-speed spin carried out at room temperature. We have found that a 10 minute spin at a relative centrifugal force equivalent to about 500×g works well when kerosene is used as the carrier. When the sample is removed from the centrifuge, it will have separated into two phases. The top phase is a dark-colored liquid that contains salt residues and large particles, while the lower phase is a solid that contains magnetic particles coated with surfactant. The top phase is removed, and the coated magnetic particles are dehydrated as completely as is practicable.

We have found that suitable dehydration can be achieved by suspending the particles in acetone, pelleting them with a 30 minute centrifugation at 1800×g, removing the acetone, and drying the particles for 8 to 12 hours in a 65° C. oven. After the particles have been dehydrated, they are dispersed in the carrier, and the fluid is subjected to another short, low-speed spin in a centrifuge. This spin pellets larger or aggregated particles. The liquid sitting above any pellet that may be formed in this spin is the homogeneous magnetic fluid of the present invention. The concentration of magnetic particles in the fluid may be increased by setting the fluid in a 65° C. oven for 8 to 12 hours to evaporate a portion of the carrier.

In addition to the kerosene and oleic acid combination described above, other pairs of carriers and surfactants may be used to generate the compositions of the present invention that are capable of forming ordered structures in thin films. Table 1 sets out representative combinations. In this table, any of the carriers listed in a cell may be used with any of the surfactants listed in the cell in the same row of the table.

TABLE 1

Carrier/Surfactant Combinations Useful for Generating Homogeneous $Fe_3O_4$ Magnetic Fluids

| Carrier | Surfactant |
|---|---|
| 1. kerosene | 1. oleic acid |
| 2. cyclohexane ($C_6H_{12}$) | 2. linoleic acid |
| 3. n-octane ($C_8H_{18}$) | 3. olive oil, a mixture of: |
| 4. n-dodecane ($C_{12}H_{26}$) | ~9% $CH_3(CH_2)_{14}COOH$, |
| 5. n-tetradecane ($C_{14}H_{30}$) | ~2% $CH_3(CH_2)_{16}COOH$, |
| 6. n-hexadecane ($C_{16}H_{34}$) | ~80% oleic acid, |
| 7. n-octadecane ($C_{18}H_{38}$) | ~10% $CH_3(CH_2)_4CH=CH-CH_2-$ |
| 8. n-eicosane ($C_{20}H_{42}$) | $CH=CH-(CH_2)_7-COOH$ |
|  | 4. $[R(COO)]_2Zn$ (where $R=CH_3(CH_2)_n$, and $4 \leq n \leq 5$) |
|  | 5. erucic acid |
| perfluoroeicosane ($C_{20}F_{42}$) | 1. oleic acid |
|  | 2. perfluoropolyether acid $CF_3CF_2[CF_2OCF(CF_3)]_5COOH$ |
| gas oil, $C_{12}$ and above hydrocarbon | 1. oleic acid |
|  | 2. olive oil |
|  | 3. $[R(COO)]_2Zn$ (where $R=CH_3(CH_2)_n$, and $4 \leq n \leq 5$) |
| perfluoro kerosene | 1. perfluoropolyether acid |
|  | 2. oleic acid |
|  | 3. olive oil |

TABLE 1-continued

Carrier/Surfactant Combinations Useful for Generating Homogeneous $Fe_3O_4$ Magnetic Fluids

| Carrier | Surfactant |
| --- | --- |
| 2-methoxyethyl ether | mixture of R—O—R' (where R or R'=$CH_3(CH_2)_n$, and $4 \leq n \leq 5$) and R need not equal R' |

Characterization of the homogeneous magnetic fluid

Based on the procedure outlined above, a homogeneous magnetic fluid is prepared. X-ray diffraction patterns of the sample can be used to verify the single phase fcc spinel structure expected for an $Fe_3O_4$ sample. The X-ray diffraction data can be compared to a standard obtained from the International Center for Diffraction Data compiled by the Joint Committee on Powder Diffraction Standards. The magnetization of the sample is measured using a vibration sample magnetometer such as a VSM Controller Model 4500 available from EG&G Princeton Applied Research. The particle size of the sample is determined from the magnetization, applied field data (M-H data) by fitting it to the Langevin function $L(\alpha)=M/M_s=(\coth \alpha - 1/\alpha)$, where $\alpha=M_s VH/kT$, M is the magnetization of the sample at an applied magnetic field strength, H, $M_s$ is the saturated magnetization of the sample, and V is the volume of a particle. Thus, because temperature, M, $M_s$, k and H are known, V can be solved for and the radius of the particle determined. The Langevin function assumes: (1) a uniform particle size; and (2) independent particle behavior. In a magnetic fluid, the particle size may be described by a normal distribution, and interactions between particles occur because the particles generate magnetic dipoles. Thus, the closer the agreement between the empirical M-H curve and the calculated Langevin function, the better the assumptions underlying the Langevin function are met. If a magnet is held near a homogeneous magnetic fluid thin film manufactured according to the methods of the present invention, a light color appears in the film and moves as the magnet is moved due to optical effects created by ordered structures formed in response to the magnetic field. Such colors are not seen in a EMG 909, a commercially available kerosene-based $Fe_3O_4$ ferrofluid obtained from Ferrofluidics Corp. (Nashua, N.H.).

Ordered structures in thin films of homogeneous magnetic fluids

A magnetic fluid synthesized according to the methods outlined above may be sealed into a number of glass cells with various cell thicknesses to form fluidic thin films. The thin films of the present invention have preferred thicknesses in the range of from about 1 micron to about 20 microns, and more preferably from about 2 microns to about 6 microns (1 micron=$10^{-6}$m). In one embodiment of the invention, magnetic fields parallel to and perpendicular to the plane of the film may be generated by Helmholtz coils and by a uniform solenoid, respectively. Alternatively, the solenoid may be replaced by Helmholtz coils for application of parallel magnetic fields, if desired. The magnetic field strength of the coils and solenoid may be related to the current supplied to these devices by using a gauss meter to measure the magnetic field. The resulting magnetic fields are uniform, with deviations of field strength in the region of the film less than 1%. To characterize the ordered structures produced by applied magnetic fields in thin films of the homogeneous magnetic fluids, we photographed the films using a Zeiss optical microscope, and the time evolution of the formation of patterns in the films was recorded using a personal computer through a CCD video camera.

Figure 2:
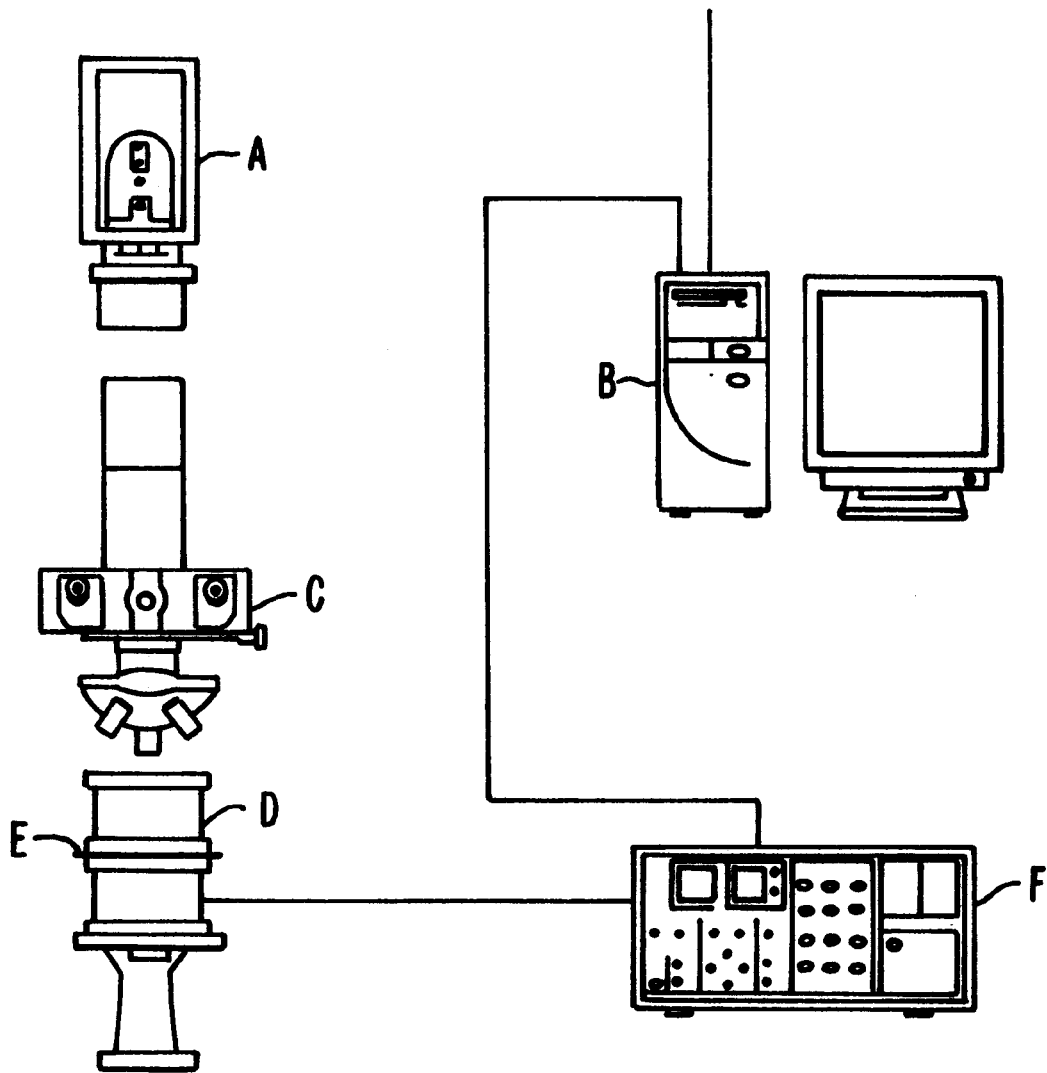
FIG. 2 illustrates a setup for measuring the properties of ferrofluidic thin films under externally applied magnetic fields.

FIG. 2 illustrates a setup useful for measuring properties of homogeneous magnetic fluid thin films under externally applied magnetic fields. The power supply used for generating the magnetic fields is computer controlled and is programmed such that the image data is obtained automatically. The program controlling the data acquisition is written such that the field strength and the rate of change of field strength can be adjusted. If desired, a delay time may be programmed prior to capturing image data after the field strength has been changed to ensure the pattern has reached a quasi-steady state.

Figure 5:
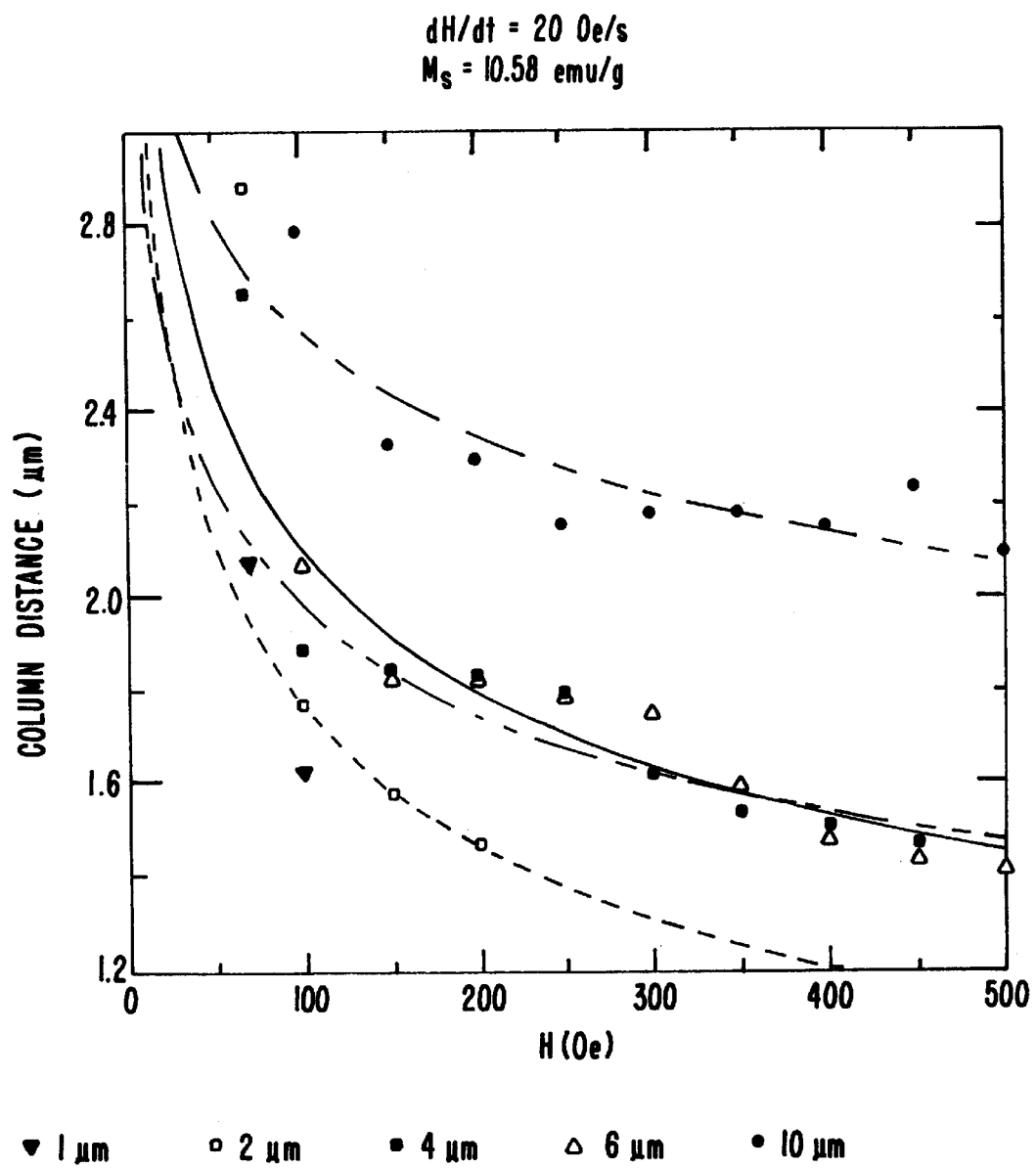
FIG. 5 is a graph showing the relation of the distance between particle columns in two-dimensional hexagonal arrays to magnetic field strength and film thickness.

When a homogeneous magnetic fluid thin film prepared according to the methods of the present invention is subjected to a perpendicularly applied magnetic field (i.e., the field direction is normal to the plane of the film), initial disorder quantum columns form. If the field strength is increased so that it exceeds a critical value, $H_h$, an equilibrium two-dimensional hexagonal structure forms with particle columns occupying lattice vertices. If the field strength is increased to another critical value, $H_1$, the pattern changes from a hexagonal structure to a labyrinthine pattern. FIG. 3 illustrates this phenomenon in a 6 $\mu$m thin film. In the range of field strength between $H_h$ and $H_1$, the distance between the particle columns is almost linearly proportional to the inverse of the field strength; the distance between the particle columns is on the order of several microns (FIG. 5). In contrast, commercially available magnetic fluids only generate disordered quantum columns under the influence of perpendicularly applied magnetic fields.

Other parameters affecting the distance between the particle columns include film thickness, L, (FIGS. 4 and 5), the rate of change of the field strength, dH/dt, (FIG. 6), the magnetic particle concentration in the fluid (volume fraction ratio), and temperature, T. The distance between columns is directly proportional to the magnetic film thickness (FIG. 5). An increase in the rate of change of field strength (dH/dt) tends to decrease the distance between columns for the same final field strength. This may be due to a boundary effect. In a plot of the distance (d) between columns (on the ordinate) as a function of field strength (H) (abscissa), a curve generated using a larger rate of field strength change will lie below and to the left of a curve generated using a smaller rate of field strength change. Volume fraction ratio may be adjusted by diluting the magnetic fluid with additional carrier. Decreasing the volume fraction tends to increase the distance between columns, when film thickness and rate of field strength change are held constant. Thus, a plot of distance as a function of field strength at two different volume fractions shows that the d-H curve shifts up and to the right as the volume fraction is reduced. An increase in temperature (T) results in a decrease in the magnetization of the particles, and produces an increase in the distance between columns as all other parameters are held constant.

If a thin film of a homogeneous magnetic fluid of the present invention is subjected to a parallel magnetic field, the magnetic particles in the thin film agglomerate and form chains parallel to the direction of the field. As the field strength is increased, these chains tend to aggregate and form coarse, long chains because of their interaction. A one-dimensional quasi-periodic structure has been observed in thin films of homogeneous magnetic fluid of the present invention. The chains exist in different layers over the thickness of the film. The distance between particle chains is inversely proportional to the field strength (FIG. 8), and proportional to film thickness (FIG. 9).

Magnetic-optical devices using homogeneous magnetic fluid thin films

Figure 10:
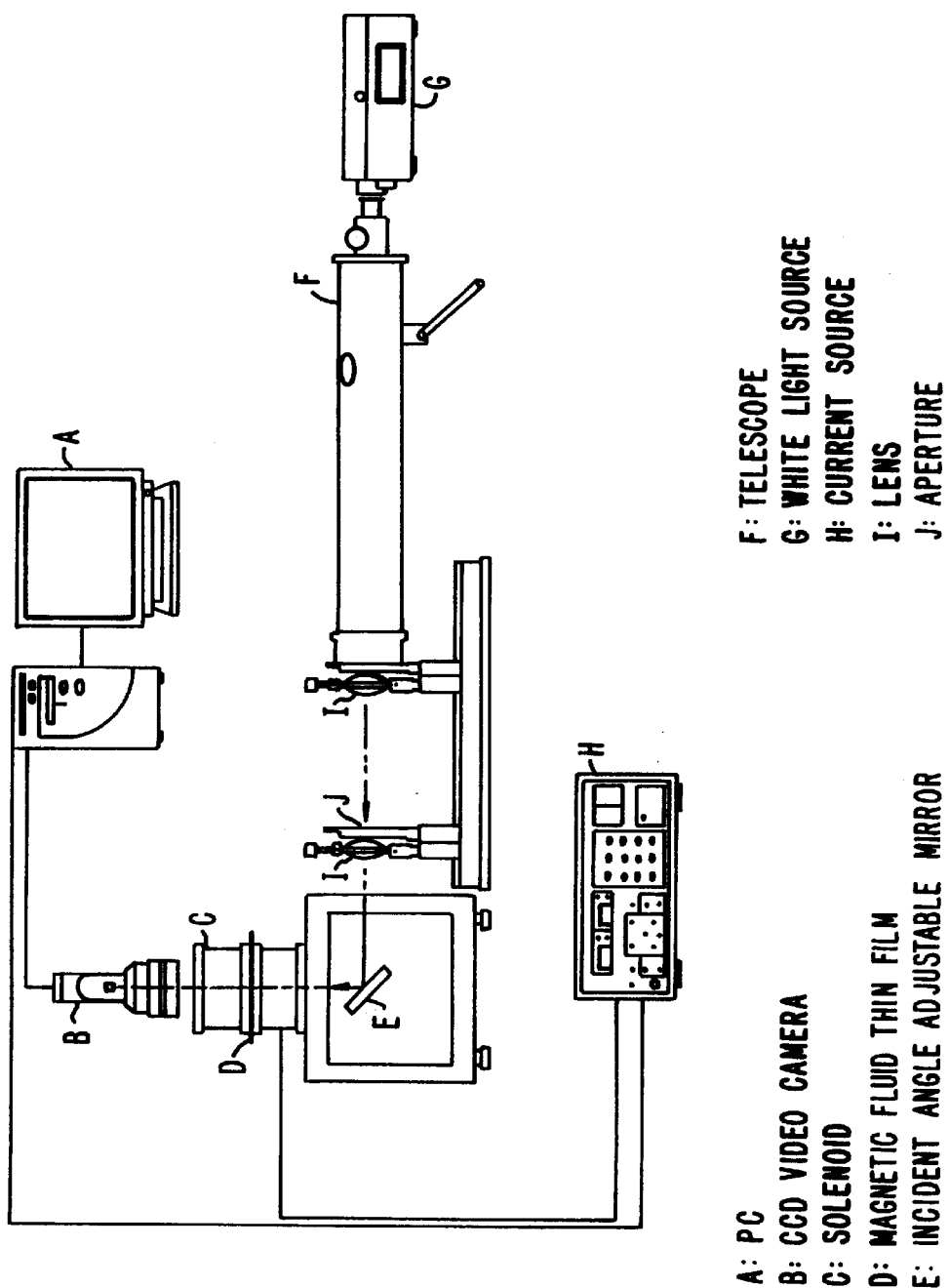
FIG. 10 illustrates a setup used for demonstrating light diffraction and double refraction phenomena generated by ordered structures in homogeneous ferrofluidic thin films.

The present invention also relates to optical phenomena created when magnetic waves pass through or are reflected by the controllable ordered structures produced in homogeneous magnetic fluid thin films of the present invention upon exposure to externally applied magnetic fields. To demonstrate these phenomena, the setup illustrated in FIG. 10 was used to construct and test magnetic-optical devices. The area of the thin film used was 1 cm×4 cm. Helmholtz coils and a uniform solenoid were respectively used to generate parallel and perpendicular magnetic fields. The resulting fields were uniform with a measured deviation of field strength in the vicinity of the thin film of less than 1%. A white light source was used (Intralux 500-1 240 Watt halogen lamp, VOLPI Manufacturing, Inc., U.S.A., lamp operated at approximately 25% maximum power). The light rays were made near parallel by passing them through a telescope. Two optical lenses were used to make the near-parallel light parallel. An aperture was placed between the two lenses to control the size of the light beam. The parallel white light was reflected by a mirror located beneath the thin film. The angle of the mirror to the light beam was adjustable by turning the mirror plane, resulting in a change of the incident angle of the light to the film. Photographic images of the light through the thin film were taken using a CCD camera that was connected to a computer for data acquisition. In addition, a conventional film camera was sometimes used to obtain images of the thin film.

Figure 11:
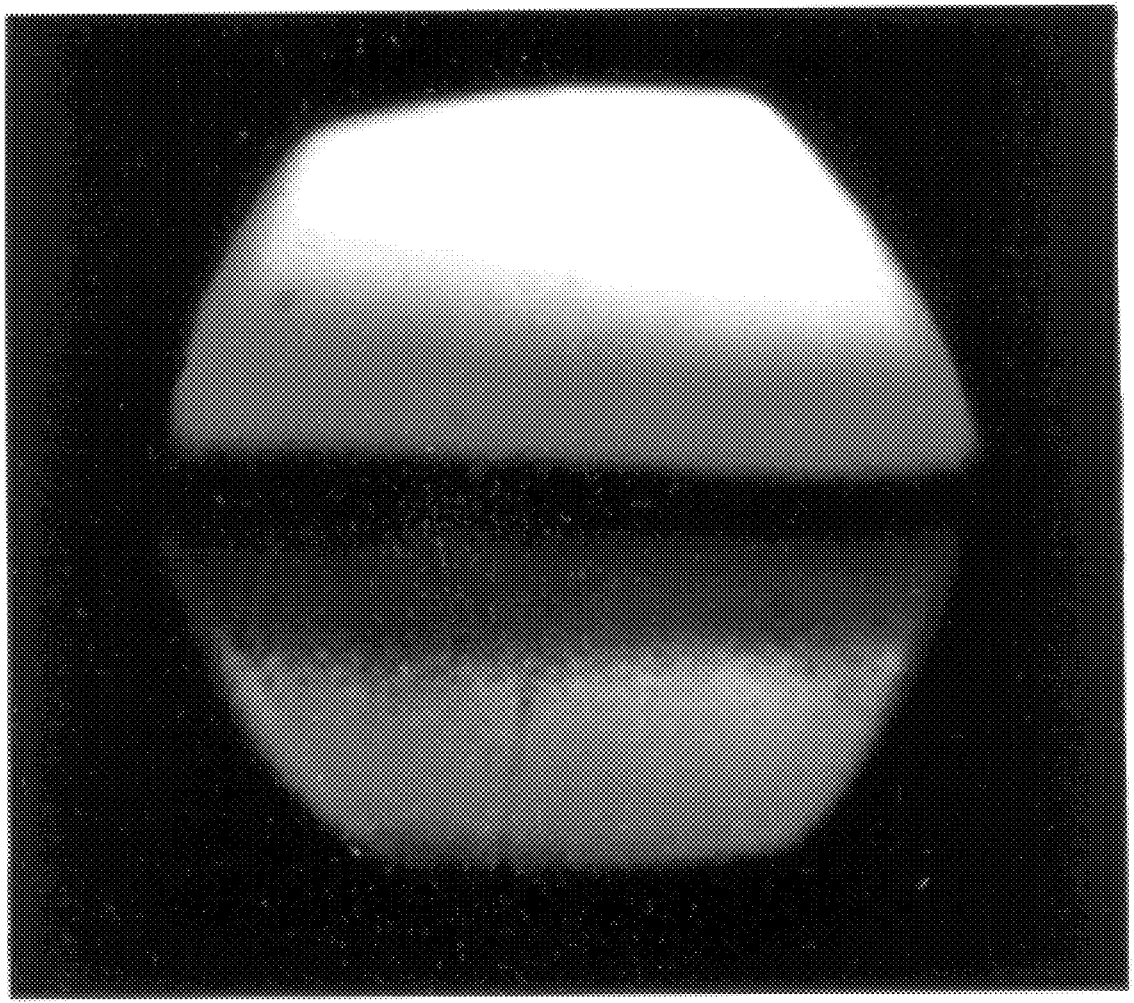
FIG. 11 shows a spectrum of colors produced by a magneto-optical device in which the thickness of the homogeneous ferrofluidic thin film varies from about 2 to 10 $\mu$m.

FIG. 11 is a photograph of a drop of a homogeneous magnetic fluid exposed to an externally applied perpendicular magnetic field. The thickness of the drop varies because of surface tension effects. Because the spacing of the ordered arrays formed in response to the external magnetic field vary as a function of film thickness, a spectrum of colors is seen when a source of parallel white light is placed below the film. The scale bar corresponds to 2 mm.

FIG. 12 is a series of photographic images of a homogeneous magnetic fluid thin film that illustrate diffraction of light by the film under the influence of an externally applied perpendicular magnetic field. The scale bar on the figure corresponds to 2 mm. In these images, all the parameters were kept constant, except the current to the solenoid used to generate the magnetic field. The color of the film changes from red to violet as the magnetic field is altered. These images demonstrate that the color of light passing through the thin film can be controlled, and that monochromatic light can be obtained from a thin film with an area on the order of several square centimeters.

A display device comprising a plurality of pixels, each of which comprises a magnetic thin film with an independent electronic circuit for controlling the magnetic field or temperature experienced by the film can therefore be constructed according to the methods of the present invention. By properly adjusting the current in each pixel, a polychromatic image may be displayed.

EXAMPLE 1

Preparation of a homogeneous magnetic fluid composition 500 mls. of an 8 molar solution of NaOH was made by adding 160 g of NaOH (95% grade, Nihon Shiyaku Industries, Ltd.) to a sufficient amount of de-ionized water to bring the final volume to 500 mls. A second solution was made by mixing 0.1 moles of $FeSO_4.7H_2O$ (98% grade, Showa Chemicals, Inc.) and 0.2 moles of $FeCl_3.6H_2O$ (97% grade, Showa Chemicals, Inc.) in a sufficient volume of de-ionized water to bring the final volume to 600 mls. A glass stirring bar was used to continuously stir the second solution while a sufficient volume of NaOH was added to raise the pH and maintain it between 11 and 11.5, as $Fe_3O_4$ precipitated out of the solution. The addition of NaOH was completed in under about 2 minutes. During this step, the temperature was held at 80° C. The precipitation process took about 20 minutes.

50 mls. of oleic acid (Showa Chemicals, Inc.) was added to the solution containing the $Fe_3O_4$ precipitate to coat the particles with oleic acid. At first, the pH value dropped substantially, and an additional volume of the NaOH solution was added to keep the pH at around 10 during the coating process. During this procedure, the temperature was maintained at 80° C. The coating process took approximately 30 minutes. At the end of this step, the solution separated into three phases. The upper phase was removed and discarded, and the middle and bottom phases were retained for use in the following step.

A volume of HCl (37.52%, Polin) was added to the retained solution sufficient to bring the pH down to about 1. This step was carried out at room temperature. The solution was stirred for about 20 minutes, as magnetic particles coated with oleic acid began to coagulate. At the end of the 20 minutes, the solution separated into two phases. The top phase, containing a black particulate suspension, was removed, and the entire acidification procedure was repeated as before. Again the top phase was removed and discarded. The black particulate suspension was not observed in the top phase formed following the second acidification step. In some syntheses, this step may have to be repeated an additional one or two times, until the black particulate suspension is no longer observed in the top phase, removing the top phase between repetitions of the process.

After the acidification steps were completed, de-ionized water at 65° C. was added to the retained bottom phase in order to remove remaining HCl and NaCl. The water was added as the material is stirred. A sufficient volume of water was added to raise the pH of the material to around 5. The solid material was allowed to settle and the water was decanted.

The solid material was washed by adding 1.1 ml. of kerosene per gram of solid. This was stirred until the solid material was completely dispersed in the kerosene, and the solution was placed in a centrifuge tube and centrifuged for 10 minutes at around 500×g. This and all other centrifugation steps were carried out at room temperature. After centrifugation, the sample had separated into two layers. The top layer was a dark colored liquid containing salt residues and large particles, and the lower layer was a solid phase which contained magnetic particles coated with oleic acid. The upper phase was removed, and the magnetic particles were dehydrated by suspending the material in acetone, pelleting it by centrifugation for 30 minutes at around 1800×g, removing the acetone, and drying the magnetic particles in a 65° C. oven for 8 to 12 hours. Finally, the dried particles were dispersed into kerosene using a kerosene-to-particle ratio of 2 ml/g. This was centrifuged again at around 500×g for 10 minutes. The supernatant was removed from the test tube and placed in a 65° C. oven for approximately 10 hours to drive off a portion of the kerosene and thereby raise the $Fe_3O_4$ concentration. The fluid was removed from the oven and was used to form ordered structures in thin films. Aliquots of this homogeneous magnetic fluid were sealed into glass cells to form magnetic fluid thin films.

An X-ray diffraction pattern for the $Fe_3O_4$ sample verified the single phase fcc spinel structure of the sample. The lattice constant was measured to be 8.40 Å. The magnetization of the sample was measured using a vibration sample magnetometer, and a saturation magnetization value of 10.58 emu/g was measured for the homogeneous magnetic fluid. The volume fraction of the homogeneous magnetic fluid was calculated as the ratio of the saturated magnetization of the magnetic fluid to that of the dry $Fe_3O_4$ powder. This ratio was 18.9%.

EXAMPLE 2

Two-dimensional ordered structures as a function of applied field strength

Figure 3A:
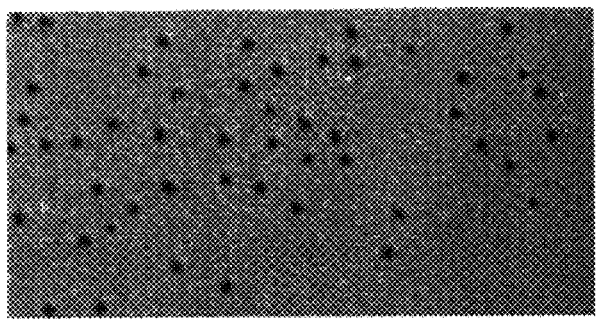
FIG. 3 illustrates two-dimensional hexagonal arrays with particle columns occupying lattice vertices generated in a homogeneous ferrofluidic thin film in response to an externally applied magnetic field oriented perpendicularly to the plane of the film.
Figure 3B:
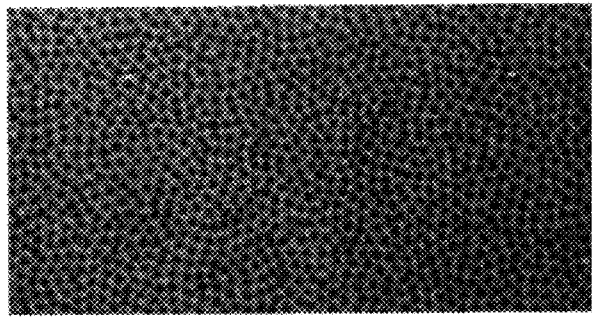
Figure 3C:
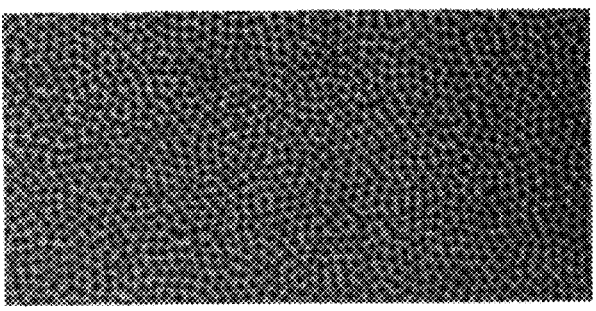
Figure 3D:
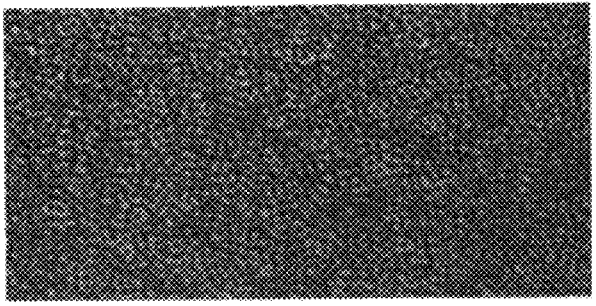
Figure 4A:
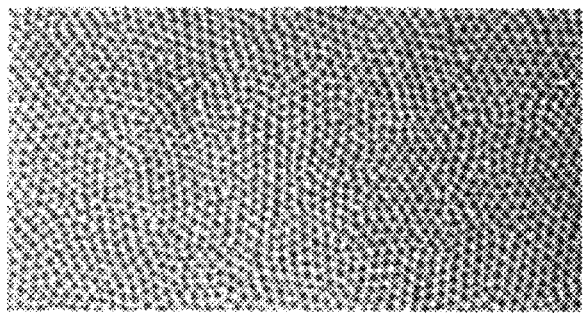
FIG. 4 shows two-dimensional hexagonal arrays formed in films with different thicknesses in response to a perpendicular, 100 Oe magnetic field.
Figure 4B:
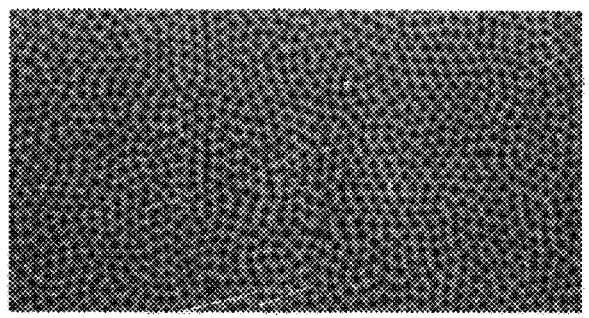
Figure 4C:
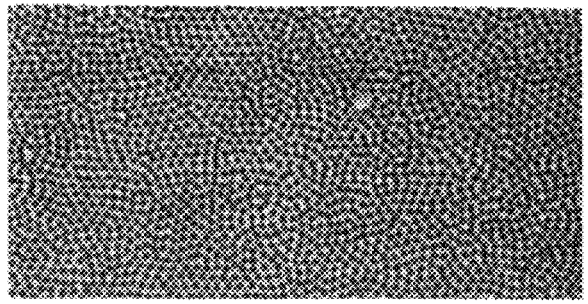
Figure 4D:
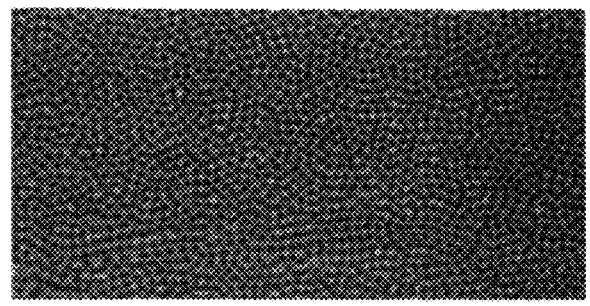

The setup illustrated in FIG. 2 was used to examine pattern formation in a thin film of the homogeneous magnetic fluid thin film synthesized in Example 1 in response to an externally applied magnetic field oriented perpendicularly to the plane of the film. In this example, the strength of the applied field was varied. FIG. 3 shows images taken of a 6 μm thick magnetic fluid thin film using a CCD video camera that demonstrate the evolution of the two-dimensional ordered structure pattern from disorder quantum columns (FIG. 3*a*), to an ordered hexagonal structure (FIGS. 3*b* and 3*c*), and to a disordered labyrinthine pattern (FIG. 3*d*). These images illustrate that the distance between columns was roughly inversely proportional to the field strength in the range between two critical strengths, $H_h$ and $H_1$.

EXAMPLE 3

Two-dimensional ordered structures as a function of film thickness

In this example, the effect of film thickness on pattern formation was examined. The two-dimensional ordered structures in homogeneous magnetic fluid thin films with different thicknesses were investigated using the setup illustrated in FIG. 2. During this experiment, all parameters remain unchanged except the thickness of the film, which was varied from 10 μm to 2 μm by using glass sample cells having different cell depths. FIG. 4 provides examples of images of thin films of the homogeneous magnetic fluid synthesized in Example 1 taken by the CCD camera using a constant field strength of 100 Oe in which a two-dimensional hexagonal structure had formed in the films under investigation. These images indicate that the distance between columns is roughly proportional to the thickness of the films over the range of film thickness examined.

The results obtained in Examples 2 and 3 show that a two-dimensional hexagonal structure forms in homogeneous magnetic fluid thin films that are subjected to an externally applied perpendicular magnetic field. The distance between columns is closely related to the inverse of the field strength and is roughly proportional to film thickness, at least over the range of thickness shown in Example 3. FIG. 5 plots the distance between columns as a function of film thickness and magnetic field strength.

EXAMPLE 4

Figure 6:
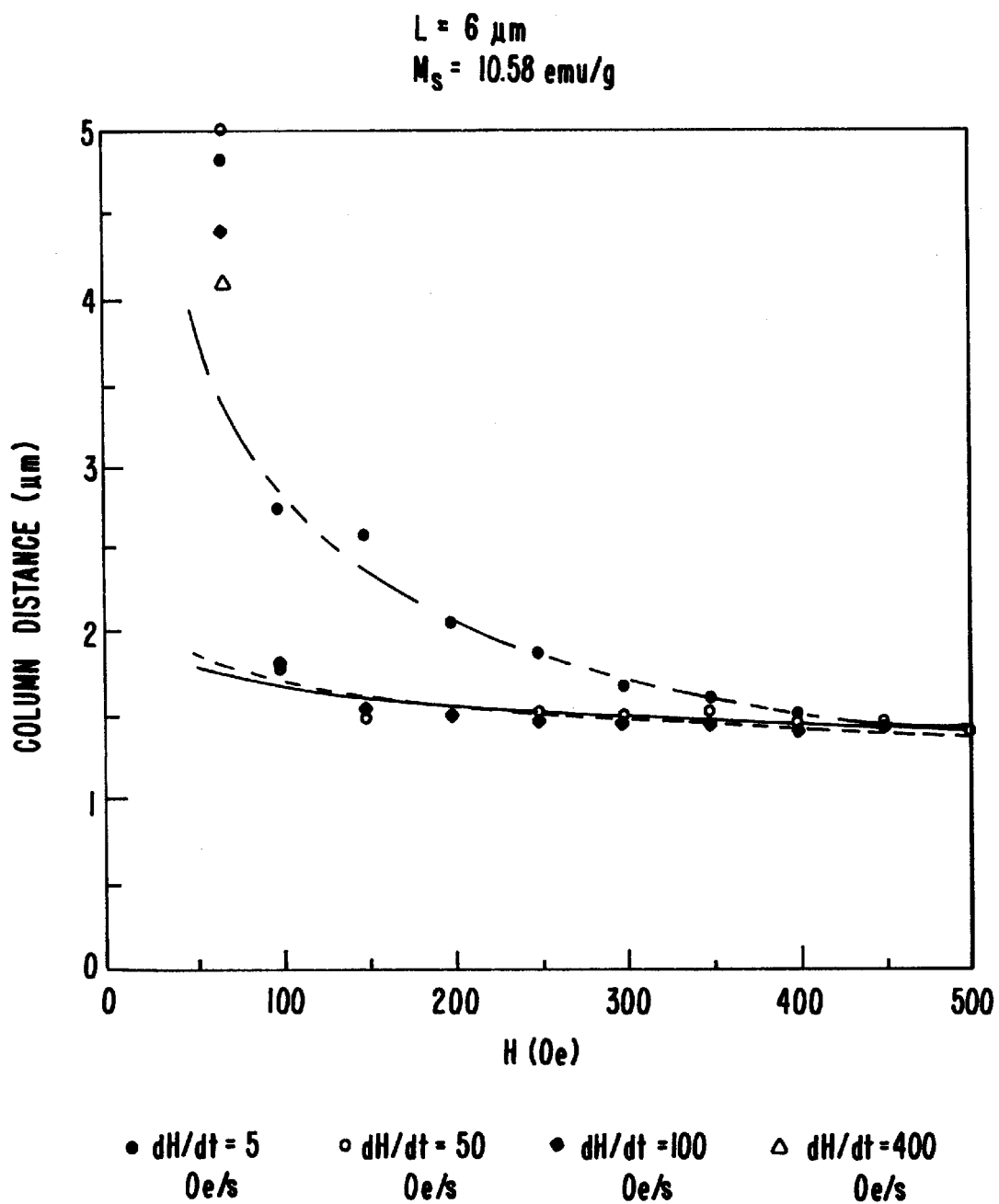
FIG. 6 is a graph showing the relation of the distance between particle columns in two-dimensional hexagonal arrays to the magnetic field strength and the rate of change of magnetic field strength.

Two-dimensional ordered structures as a function of the rate of change of field strength The effect of the rate of change of the magnetic field strength was investigated, using rates of 5 Oe/s, 50 Oe/s, 100 Oe/s, and 400 Oe/s. FIG. 6 shows the relationship between column distance as a function of field strength using different rates of field strength change (dH/dt). The figure shows that as the rate is increased, the curves are displaced downward and to the left. That is, as the rate of field strength change increases, the distance between the columns decreases.

EXAMPLE 5

Two-dimensional ordered structures as a function of volume fraction ratio

Figure 7:
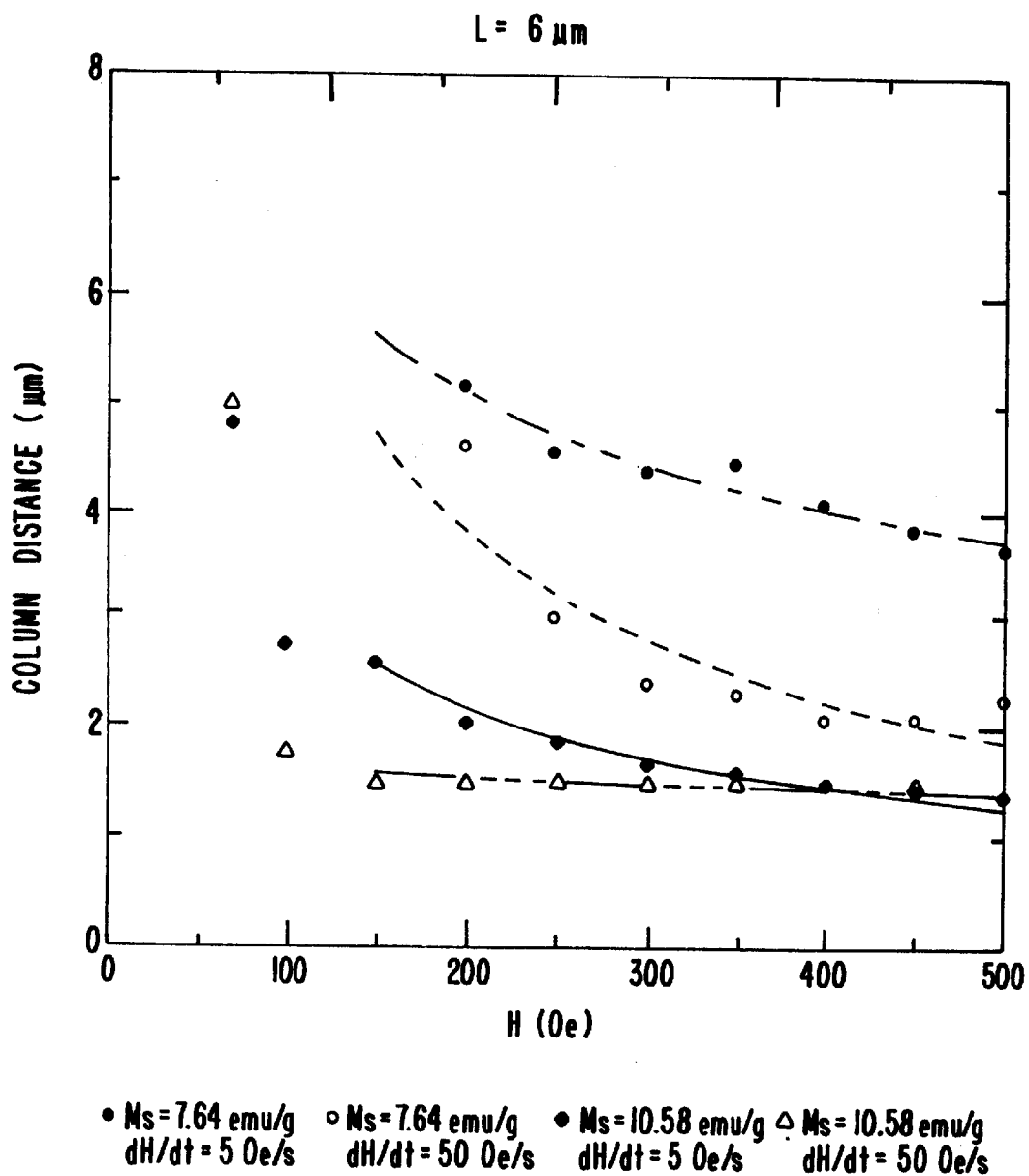
FIG. 7 is a graph relating the distance between particle columns in two-dimensional hexagonal arrays to the magnetic field strength and the volume fraction ratio between the magnetic particle and liquid carrier components of the ferrofluid.
Figure 8A:
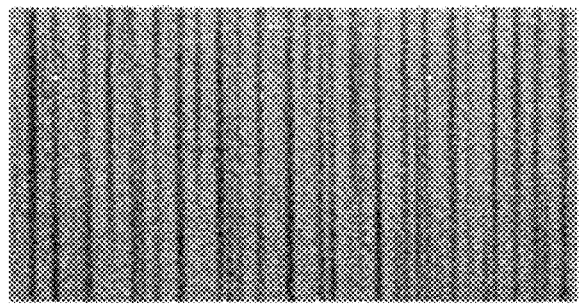
FIG. 8 illustrates the relationship between the periodic spacing of particle chains formed in a homogeneous ferrofluidic thin film and the strength of an external magnetic field that is parallel to the plane of the film.
Figure 8B:
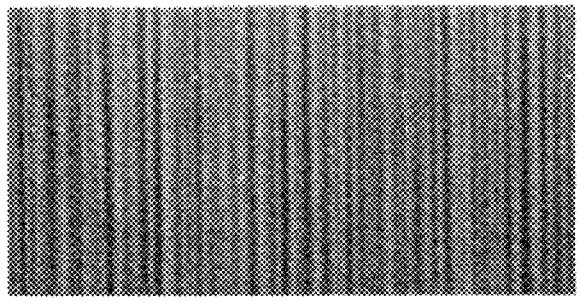
Figure 8C:
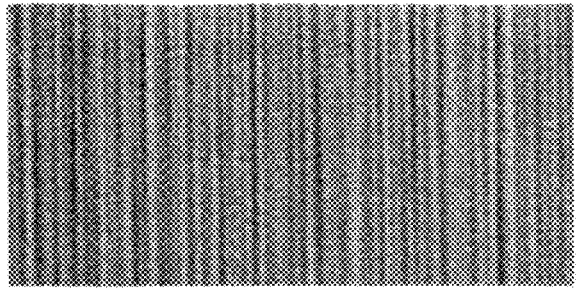
Figure 8D:
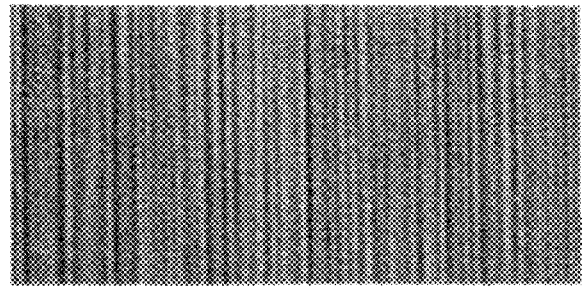
Figure 9A:
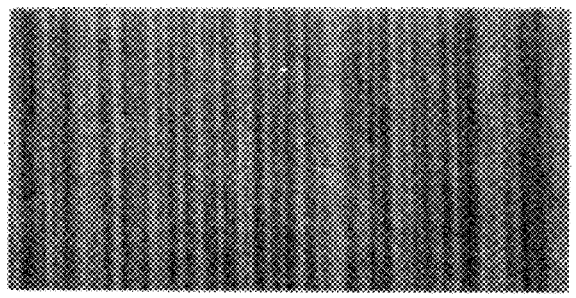
FIG. 9 illustrates the relationship between the periodic spacing of particle chains formed in a homogeneous ferrofluidic thin film exposed to a parallel external magnetic field as a function of film thickness.
Figure 9B:
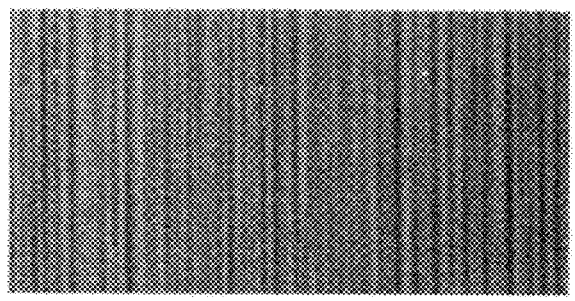
Figure 9C:
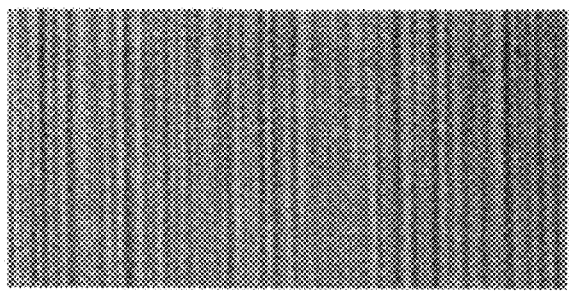
Figure 9D:
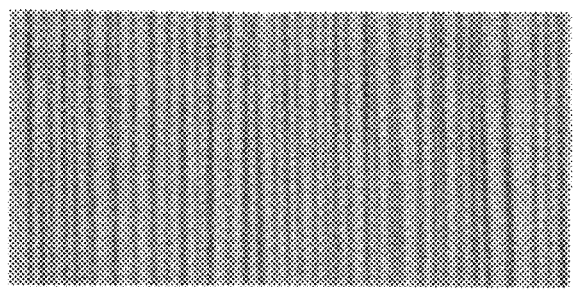

Magnetic fluid samples with varying volume fraction ratios between the magnetic particles and the carrier liquid were made according to the method of Example 1, except in the final dispersing step, the volume of kerosene added was altered to vary the volume fraction ratio of the fluid. FIG. 7 shows that a decrease in the volume fraction ratio produces a shift in the distance versus field strength plots toward the upper right. That is, holding all other parameters constant, a decrease in the volume fraction ratio increases the distance between columns.

In the following two examples, the solenoid was replaced by Helmholtz coils in the setup shown in FIG. 2. As a result, the orientation of the magnetic field applied to the thin film was parallel to the plane of the film.

EXAMPLE 6

One-dimensional ordered structures as a function of applied field strength

In this example, the homogeneous magnetic fluid thin film was subjected to an externally applied magnetic field that was parallel to the plane of the film. As the field was applied, the magnetic particles in the film agglomerated and formed chains in the plane of the thin film oriented along the field direction. These particle chains exist in different layers over the thickness of the film. When the field strength was increased, the chains became periodic and the distance between the chains decreased proportionately. FIG. 8 shows the effect of varying the field strength from 100 Oe to 400 Oe on the distance between the periodic particle chains in the homogeneous magnetic fluid thin film.

EXAMPLE 7

One-dimensional ordered structures as a function of film thickness

In this example, the effect of thin film thickness on the one-dimensional periodic structures formed in response to parallel magnetic fields was examined. The homogeneous magnetic fluid was sealed into glass cells with different cell depths, allowing the effect of film thickness to be investigated. FIG. 9 shows that the distance between particle chains was found to be proportional to the thickness of the thin film in the range of thickness from 10 μm to 2 μm when all other parameters were held constant.

EXAMPLE 8

First type of light diffraction color display

When an applied perpendicular magnetic field reaches a critical value $H_h$, a two dimensional column array is formed in a homogeneous magnetic fluid thin film. Diffraction phenomena occur as a parallel white light ray passes through the film, and constructive and destructive interference occurs as the light rays reach the eyes of a viewer. FIG. 13 is a cross section drawing of arrays formed in a homogeneous magnetic thin film illustrating the light diffraction concept. In this Figure, d is the distance between columns in a two-dimensional column array, θ is the angle formed between the incoming light ray and the direction perpendicular to the plane of the film, θ' is the angle formed between the diffracted rays and the direction perpendicular to the plane of the film, and N is the total number of magnetic particle columns diffracting the light. After diffraction, the intensity of the light, I, is $$I \alpha \frac{\sin^2(N\varphi/2)}{\sin^2(\varphi/2)}$$

where $$\varphi = \frac{2\pi}{\lambda} d(\sin\theta + \sin\theta')$$

and λ is the wavelength of light. The condition under which the light intensity, I, becomes maximum is the same as that under which the light becomes brightest after diffraction through the film. This condition is $$\frac{\varphi}{2} \equiv \frac{\pi}{\lambda} d(\sin\theta + \sin\theta') = \kappa\pi$$

where κ is a non-negative integer.

The angle θ can be designed such that sinθ>>sinθ'. For a fixed angle θ, the color observed by the viewer will not change due to the limited movement of the viewer when the viewer is far away from the film. Meanwhile, the condition of κ=0 will never occur. The condition of κ=1 is the most interesting and important one. Under this condition, d will be related to λ by d sinθ=λ

If this wavelength λ is within the range of visible light, then the same d will also allow only light with a wavelength of λ/κ for κ=2, 3, . . . to pass through the film. Fortunately, light with these wavelengths are outside the visible spectrum. The reason for this is that the longest wavelength of light visible to the human eye is about 0.7 µm, and so the wavelength of λ/2=0.35 µm. This wavelength is in the ultraviolet region of the electromagnetic spectrum and therefore is not visible to the human eye. Consequently, the viewer will only observe a single wavelength of light.

Of course, there will be dispersion for the intensity, I. The degree of the dispersion δλ must satisfy the condition δλ/λ=1/N. In the case of a two dimensional column array of a homogeneous magnetic fluid thin film, N is very large and depends on the area of the film. Thus, δλ/λ is very small. If the distance between columns d satisfies d=λ/sinθ, a pure monochromatic color will be observed. Fortunately, the distance between the columns in two dimensional column arrays of homogeneous magnetic fluid prepared according to the methods of the present invention is on the order of several micrometers. Therefore, the array is capable of diffracting visible light to produce intensity interference. Furthermore, because the distance d can be manipulated by, e.g., controlling the strength of the externally applied magnetic field, the rate of change of the magnetic field strength (dH/dt), the angle between the magnetic field and the film, the thickness of the homogeneous magnetic fluid thin film, and/or its temperature, the color of the light observed by the viewer can be changed at will.

A display constructed according to the methods of the present invention will comprise many pixels. Each pixel is made of a homogeneous magnetic fluid thin film with an electronic circuit. The electronic circuit is used to drive the change of the column distance in individual pixels, resulting in a change of color of the outgoing light. FIG. 14 is a conceptual drawing of a pixel. As the distance, d, of the pixels in a display device are individually adjusted, the display will generate a polychromatic image.

Diffraction phenomena also will occur in a homogeneous magnetic fluid thin film under the influence of an externally applied parallel magnetic field, according to the diffraction principles set out by Bragg. As the field is applied to the film, the magnetic particles agglomerate and form chains parallel to the plane of the thin film. The distance between chains can be controlled by changes in the field strength. When an incident white light beam forms an angle with the plane of the thin film, chains will reflect the beam. Since these chains are in different layers inside the film, the reflection of light by chains at different layers will interfere, resulting in a very sharp color. Here again, the externally applied magnetic field can be adjusted to obtain the desired colors.

EXAMPLE 9

Monochromatic light diffraction switch

As provided in Example 8, the homogeneous magnetic fluid thin film can be used to create monochromatic light with wavelength λ from white light. Under the same conditions as described in Example 8; i.e., sinθ>>sinθ' the diffraction occurs only when the column distance in the two dimensional column array of the homogeneous magnetic fluid thin film satisfies the condition of d sinθ=λ. That is, under a particular strength of external magnetic field, a monochromatic color of light is diffracted by the film and passes through it to reach the eyes of the viewer. By adjusting the field strength of the externally applied perpendicular magnetic field, one should be able to close or open the light switch. If there is a color dye covering the film, the desired color will appear by opening the switch.

EXAMPLE 10

Tunable wavelength filter by light diffraction

This example also uses the concepts developed in Example 8. The column distance of the hexagonal structure formed in the homogeneous magnetic fluid thin film is adjustable and is around several micrometers. As mentioned in Example 8, one can select any specific electromagnetic wave with a wavelength on the order of the column spacing by adjusting this spacing, d. The design of the homogeneous magnetic thin film and its electronic circuitry are similar to those illustrated in Example 8, except the area of the thin film may be substantially larger.

EXAMPLE 11

Second type of light diffraction color display

The idea of the second type of light diffraction color display is a combination of the technologies used in Example 8 and Example 9. This display consists of a large number of pixels. Each pixel includes three monochromatic light diffraction switches placed adjacent to each other. Each switch is made of a homogeneous magnetic fluid thin film with an accompanying electronic circuit for controlling the distance, d. The light sources for the three switches are red, green, and blue, respectively. The switches are set to allow only the passage of red, green, or blue light, individually.

By properly adjusting the current in the control circuits, one is able to turn the monochromatic light switch on or off, and hence allow none or one of these three colors to pass through its switch. Therefore each pixel of the display will show either black, red, green, blue, or any combination of these three colors. When the currents of the switches comprising the pixels are adjusted individually, the display will generate a colorful RGB (red, green, blue) picture.

EXAMPLE 12

Light double refraction color display

This example is an application of the use of homogeneous magnetic fluid thin films under an external magnetic field oriented parallel to the plane of the thin film. Under the applied field, the magnetic particles agglomerate and form chains in the plane of the film. These chains exist at different layers over the thickness of the film. The magnetic fluid inside the thin film becomes an anisotropic medium due to the directional arrangements of the particle chains.

The light refraction index $n_\parallel$, along the direction of the chains will be different from the light refraction index, $n_\perp$, along the direction perpendicular to the chains. Thus, after traveling a distance, s inside the magnetic fluid, in which s is the thickness of the film, the plane of polarization of a light wave with the electric field parallel to the direction of the chains will be different from that with the electric field perpendicular to the direction of the chains. Denoting these field strengths by $E_\parallel$ and $E_\perp$, they are $$E_\parallel \alpha e^{i\omega\left(t - \frac{n_\parallel \cdot s}{c}\right)}$$

and $$E_\perp \alpha e^{i\omega\left(t - \frac{n_\perp \cdot s}{c}\right)}$$

where $$i = \sqrt{-1},$$

ω is the frequency of the electromagnetic wave, t is time, and c is the speed of light. These electromagnetic waves interfere due to the different values of $n_\parallel$ and $n_\perp$. This example is an application of control of the interference of two light waves by adjusting the strength of the externally applied magnetic field, resulting in changes in the difference between $n_\parallel$ and $n_\perp$. FIG. 15 illustrates this invention embodied in this e.

In FIG. 15, two polarizers, with their polar axes perpendicular to each other, cover both sides of a homogeneous magnetic fluid thin film. The externally applied magnetic field is chosen such that its field direction forms a 45° C. angle with the polar axes of both polarizers. When light impinges on the polarizer, only light parallel to the direction of the polar axis of the polarizer will be transmitted. Since these two polarizers are perpendicular to each other, the light which passes through the first polarizer can not pass through the second polarizer. However, when there is an anisotropic medium between the two polarizers, the electric field of the incoming light is rotated. Thus some of the light will be able to pass through the second polarizer.

In this example, in external magnetic field is applied parallel to the film, and the magnetic fluid inside the film becomes anisotropic. As a result of the difference created between $n_\parallel$ and $n_\perp$, the plane of polarization of the light will be rotated as it passes through the film. Therefore, some light will be able to pass through the second polarizer and reach the eyes of the viewer. Practically, the intensity of light that passes through both polarizers and the homogeneous magnetic fluid thin film is proportional to $$\sin^2 \frac{\pi s}{\lambda}(n_\parallel - n_\perp).$$

The condition for the maximum intensity is $$\frac{\pi s}{\lambda}(n_\parallel - n_\perp) = \frac{\pi}{2}(2\kappa + 1),$$

in which κ is a non-negative integer. In this case, s, the thickness of the film can not be changed by changing the external magnetic field. However, the value of $(n_\parallel - n_\perp)$ can be changed by changing, e.g., the strength of the external field. Thus, one is able to obtain light with the desired wavelength by, e.g., adjusting the strength of the external magnetic field. The pixel and the electronic circuit that drives the magnetic field are similar to those shown in Example 8, with the only difference being that, in this example, the magnetic field is parallel to the plane of the homogeneous magnetic fluid film.

The above examples are provided to illustrate the invention but not to limit its scope. Other variants of the invention will be readily apparent to one of ordinary skill in the art and encompassed by the appended claims. All publications, patents, and patent applications cited herein are hereby incorporated by reference.

What is claimed is:

1. A magnetic fluid composition, consisting essentially of: $Fe_3O_4$ particles coated with a surfactant and dispersed in a continuous phase carrier liquid, wherein the composition forms a crystalline array when exposed to an external magnetic field that exceeds a critical field strength.

2. A method of synthesizing a magnetic fluid composition that forms a crystalline array when exposed to an external magnetic field that exceeds a critical field strength, comprising the steps of:

(a) precipitating $Fe_3O_4$ from an aqueous solution consisting of $FeCl_3$ and $FeSO_4$ solution by adding a sufficient amount of an hydroxide-containing base to raise the pH of the solution to and maintain it at between 11 and 11.5, wherein the time elapsed from the start of the alkali addition and the attainment of a pH value of 11 is less than or equal to 2 minutes;

(b) coating the $Fe_3O_4$ particles with a surfactant;

(c) coagulating the coated $Fe_3O_4$ particles by adding a sufficient amount of an acid to reduce the pH of the liquid containing the coated particles to pH 1 or below;

(d) recovering the coated $Fe_3O_4$ particles and suspending them in a volume of water sufficient to raise the pH of the suspension to between 4.7 and 5.0;

(e) recovering the coated $Fe_3O_4$ particles from the aqueous suspension;

(f) washing the recovered coated $Fe_3O_4$ particles in a carrier liquid;

(g) dehydrating the coated $Fe_3O_4$ particles; and (h) suspending the coated $Fe_3O_4$ particles in the carrier liquid.

3. The method of claim 2, wherein the base is NaOH, the surfactant is oleic acid, and the carrier is kerosene.

4. The method of claim 2, wherein the dehydrating step comprises the steps of:
  (a) suspending the coated $Fe_3O_4$ particles in acetone;
  (b) recovering the coated $Fe_3O_4$ particles from the acetone; and
  (c) drying the recovered particles.

5. A method of forming a crystalline array having array elements that comprise magnetic particle columns that occupy lattice vertices, the method comprising: exposing to an external magnetic field a thin film of a homogeneous magnetic fluid composition consisting essentially of magnetic particles, a surfactant, and a continuous phase liquid carrier, wherein the strength of the magnetic field exceeds a critical value, the field orientation is not parallel to the plane of the film, and the composition forms a crystalline array.

6. The method of claim 5, wherein the external magnetic field is oriented normal to the plane of the film.

7. The method of claim 5, wherein the angle between the external magnetic field and the plane of the film is greater than 0° and less than or equal to 90°.

8. A crystalline array made by the method of claim 5.

9. The array of claim 8, wherein the array is capable of diffracting visible light.

10. A method of altering the distance between the elements of the array of claim 8, comprising changing a control parameter.

11. The method of claim 10, wherein the control parameter is the externally applied magnetic field strength.

12. The method of claim 10, wherein the control parameter is the rate of change of the externally applied magnetic field.

13. The method of claim 10, wherein the control parameter is the thickness of the film.

14. The method of claim 10, wherein the control parameter is the volume fraction of the magnetic particles in the fluid.

15. The method of claim 10, wherein the control parameter is the orientation of the externally applied magnetic field with respect to the plane of the film.

16. The method of claim 10, wherein the control parameter is the temperature of the film.

17. A product manufactured according to the process of claim 2.

\* \* \* \* \*